US009456143B2

(12) United States Patent
Ikeda

(10) Patent No.: US 9,456,143 B2
(45) Date of Patent: Sep. 27, 2016

(54) IMAGE CAPTURE CONTROLLING DEVICE, IMAGE CAPTURE CONTROLLING METHOD, AND PROGRAM

(71) Applicant: SONY CORPORATION, Tokyo (JP)

(72) Inventor: Hiroshi Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/401,637

(22) PCT Filed: Apr. 2, 2013

(86) PCT No.: PCT/JP2013/060068
§ 371 (c)(1),
(2) Date: Nov. 17, 2014

(87) PCT Pub. No.: WO2013/190880
PCT Pub. Date: Dec. 27, 2013

(65) Prior Publication Data

US 2015/0163413 A1 Jun. 11, 2015

(30) Foreign Application Priority Data

Jun. 21, 2012 (JP) ................................ 2012-139789

(51) Int. Cl.

| | |
|---|---|
| ***H04N 5/232*** | (2006.01) |
| ***H04N 5/225*** | (2006.01) |
| ***G02B 7/10*** | (2006.01) |
| ***H04N 5/235*** | (2006.01) |
| ***H04N 5/14*** | (2006.01) |

(52) U.S. Cl.
CPC .......... *H04N 5/23296* (2013.01); *G02B 7/102* (2013.01); *H04N 5/145* (2013.01); *H04N 5/225* (2013.01); *H04N 5/2356* (2013.01); *H04N 5/23216* (2013.01); *H04N 5/23219* (2013.01); *H04N 5/23229* (2013.01); *G03B 2205/0046* (2013.01)

(58) Field of Classification Search
CPC .................... H04N 5/23296; H04N 5/23219; H04N 5/23216
See application file for complete search history.

(56) References Cited

U.S. PATENT DOCUMENTS

| | | | | |
|---|---|---|---|---|
| 5,398,095 | A * | 3/1995 | Tsukamoto et al. | 396/86 |
| 6,750,903 | B1 * | 6/2004 | Miyatake et al. | 348/218.1 |
| 2003/0142211 | A1 * | 7/2003 | Stamm | 348/169 |
| 2005/0219386 | A1 * | 10/2005 | Stavely et al. | 348/240.3 |

(Continued)

FOREIGN PATENT DOCUMENTS

| | | |
|---|---|---|
| JP | 2005-301269 | 10/2005 |
| JP | 2006-217249 | 8/2006 |

(Continued)

OTHER PUBLICATIONS

International Search Report issued Jul. 9, 2013 in PCT/JP2013/060068.

*Primary Examiner* — James Hannett
(74) *Attorney, Agent, or Firm* — Chip Law Group

(57) ABSTRACT

Provided is an image capture controlling device including a controlling unit that analyzes a subject of a consecutive zoom shooting on the basis of an image generated before starting the consecutive zoom shooting, the consecutive shooting being performed by repeating a zooming operation and an image capturing operation, and that performs a control to perform the consecutive zoom shooting using a transition condition of a zoom magnification determined on the basis of a result of the analysis.

10 Claims, 11 Drawing Sheets

IMAGE CAPTURING DEVICE 100
LENS UNIT 110
111 112 113 125
IMAGE CAPTURING ELEMENT 120
SIGNAL PROCESSING UNIT 150
RECORD CONTROLLING UNIT 151
RECORDING UNIT 152
DISPLAY CONTROLLING UNIT 171
DISPLAYING PART 172
LENS POSITION DETECTING UNIT 185
DRIVING UNIT 180
EXPOSURE CONTROLLING UNIT 190
CONSECUTIVE ZOOM SHOOTING SETTING UNIT 220
CONTROLLING UNIT 140
OPERATION RECEIVING UNIT 130

(56) References Cited

U.S. PATENT DOCUMENTS

2008/0246852 A1* 10/2008 Mori .......................... 348/222.1
2011/0228120 A1* 9/2011 Inoue et al. ............... 348/222.1

FOREIGN PATENT DOCUMENTS

JP 2007-143054 6/2007
JP 2008-252508 10/2008

* cited by examiner

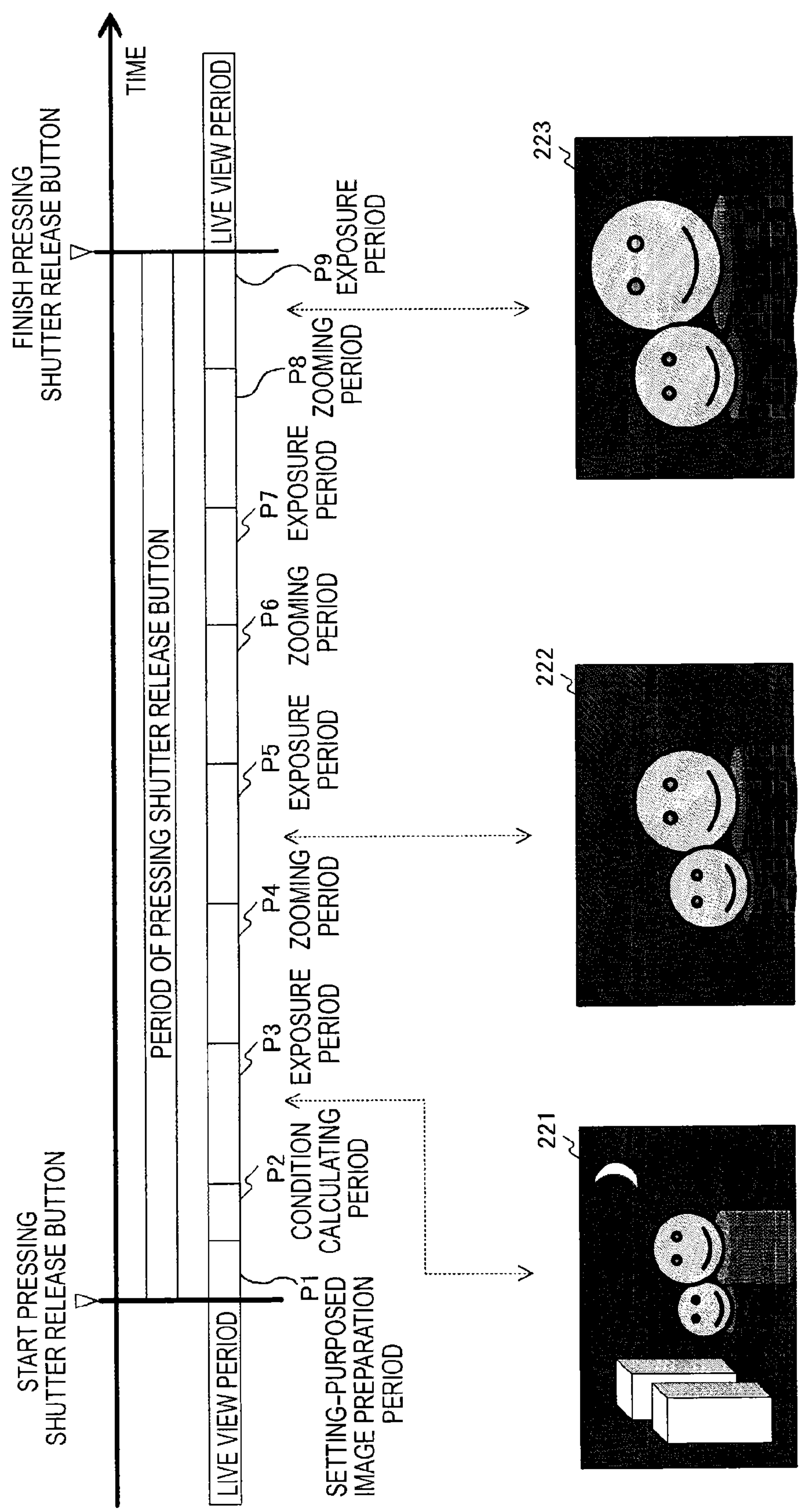
FIG. 2
TIME
START PRESSING SHUTTER RELEASE BUTTON
FINISH PRESSING SHUTTER RELEASE BUTTON
PERIOD OF PRESSING SHUTTER RELEASE BUTTON
LIVE VIEW PERIOD
LIVE VIEW PERIOD
P1 SETTING-PURPOSED IMAGE PREPARATION PERIOD
P2 CONDITION CALCULATING PERIOD
P3 EXPOSURE PERIOD
P4 ZOOMING PERIOD
P5 EXPOSURE PERIOD
P6 ZOOMING PERIOD
P7 EXPOSURE PERIOD
P8 ZOOMING PERIOD
P9 EXPOSURE PERIOD
221
222
223

FIG. 3
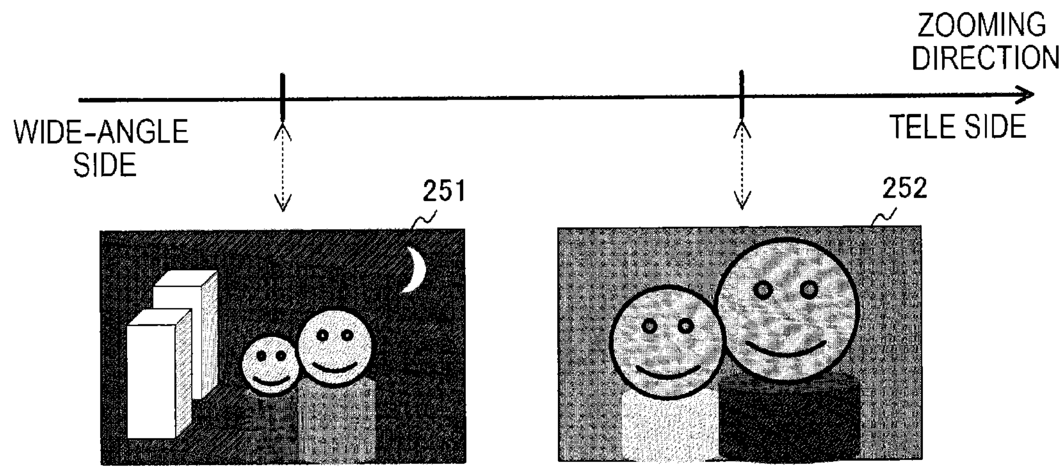
a
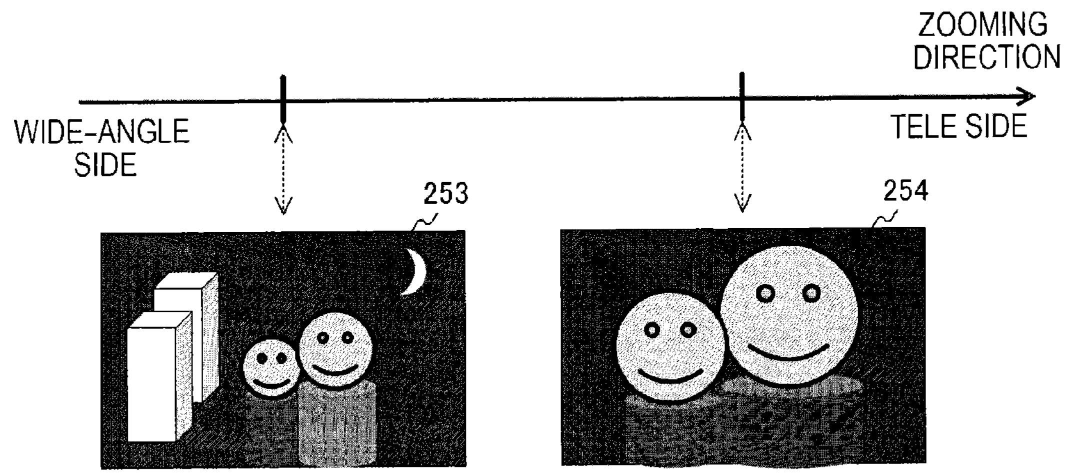
b

FIG. 6
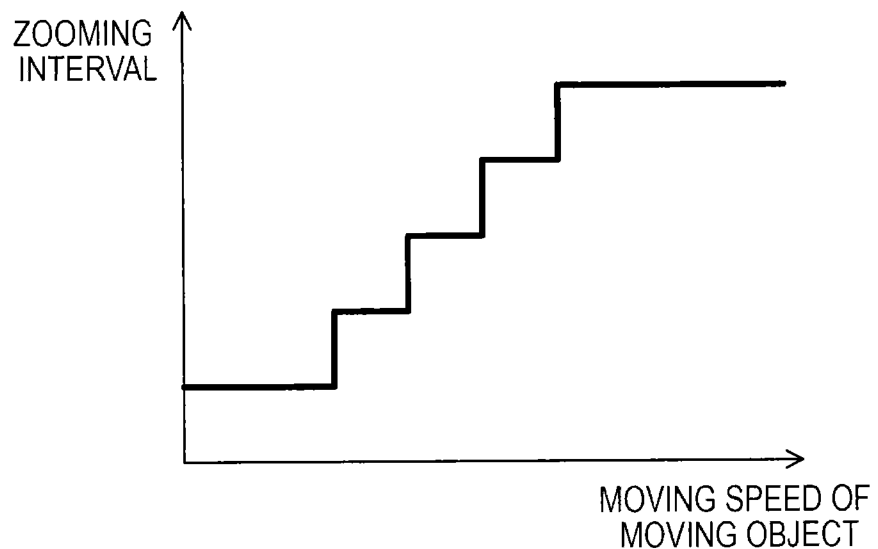
a
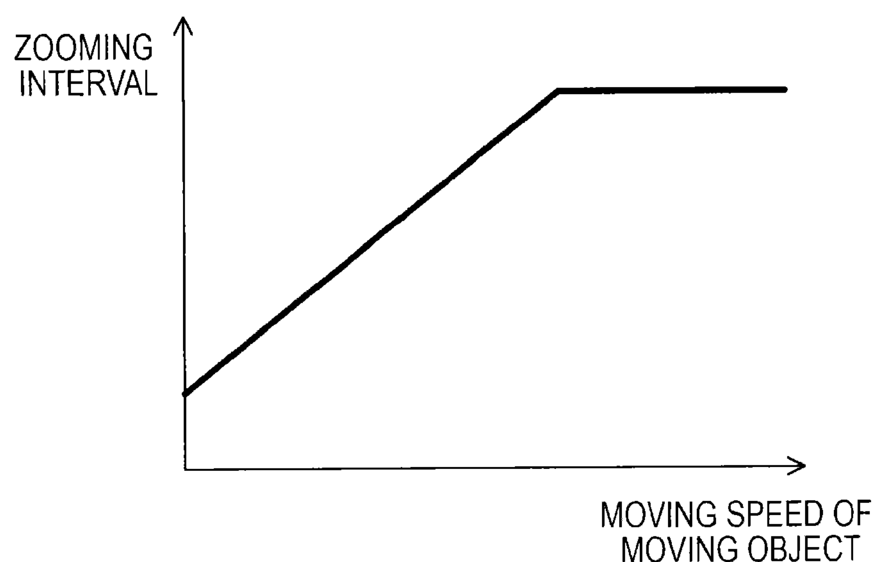
b

WHEN ZOOMING INTERVAL IS NOT SET ACCORDING TO MOVING OBJECT
TIME
E Z E E Z E Z E Z E Z E Z E Z E Z E Z E Z E Z E Z E Z E
P31
P32
P33
331
332
333
a
WHEN ZOOMING INTERVAL IS SET ACCORDING TO MOVING OBJECT (IMAGE CAPTURING DEVICE 300)
TIME
ZOOMING PERIOD
ZOOMING PERIOD
ZOOMING PERIOD
ZOOMING PERIOD
E
E
E
E
E
P41
P45
P42
351
352
b

FIG. 9
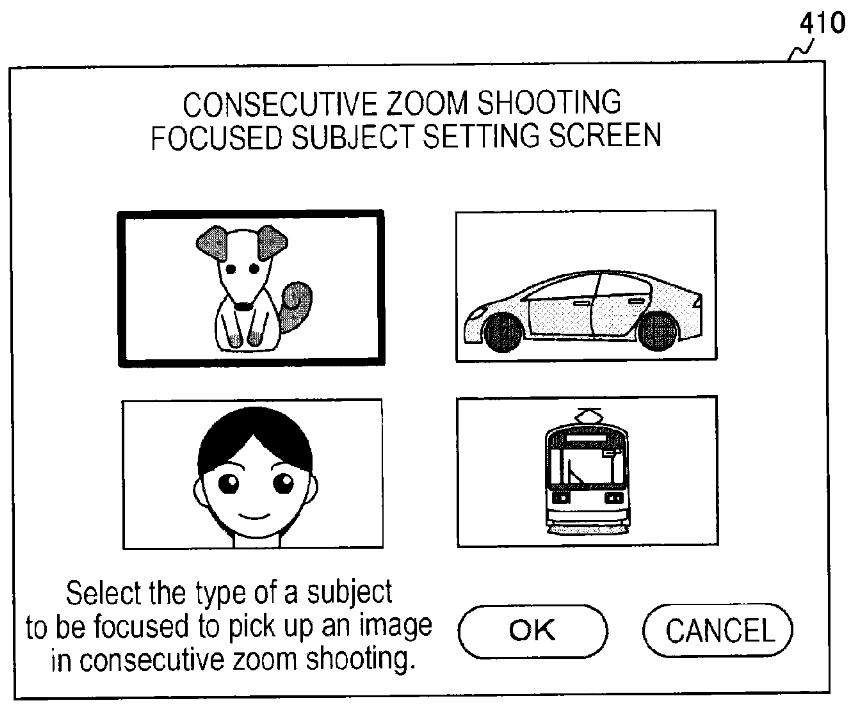
a
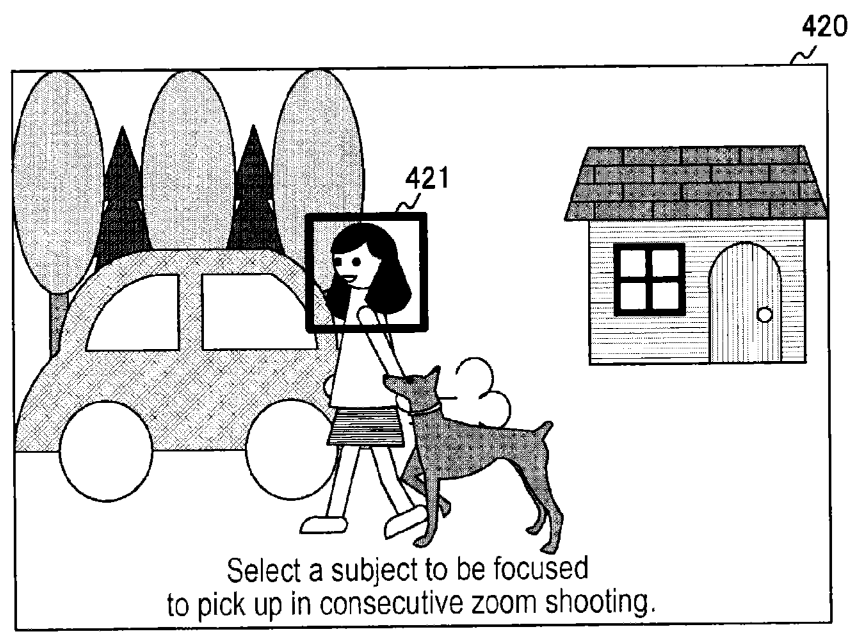
b

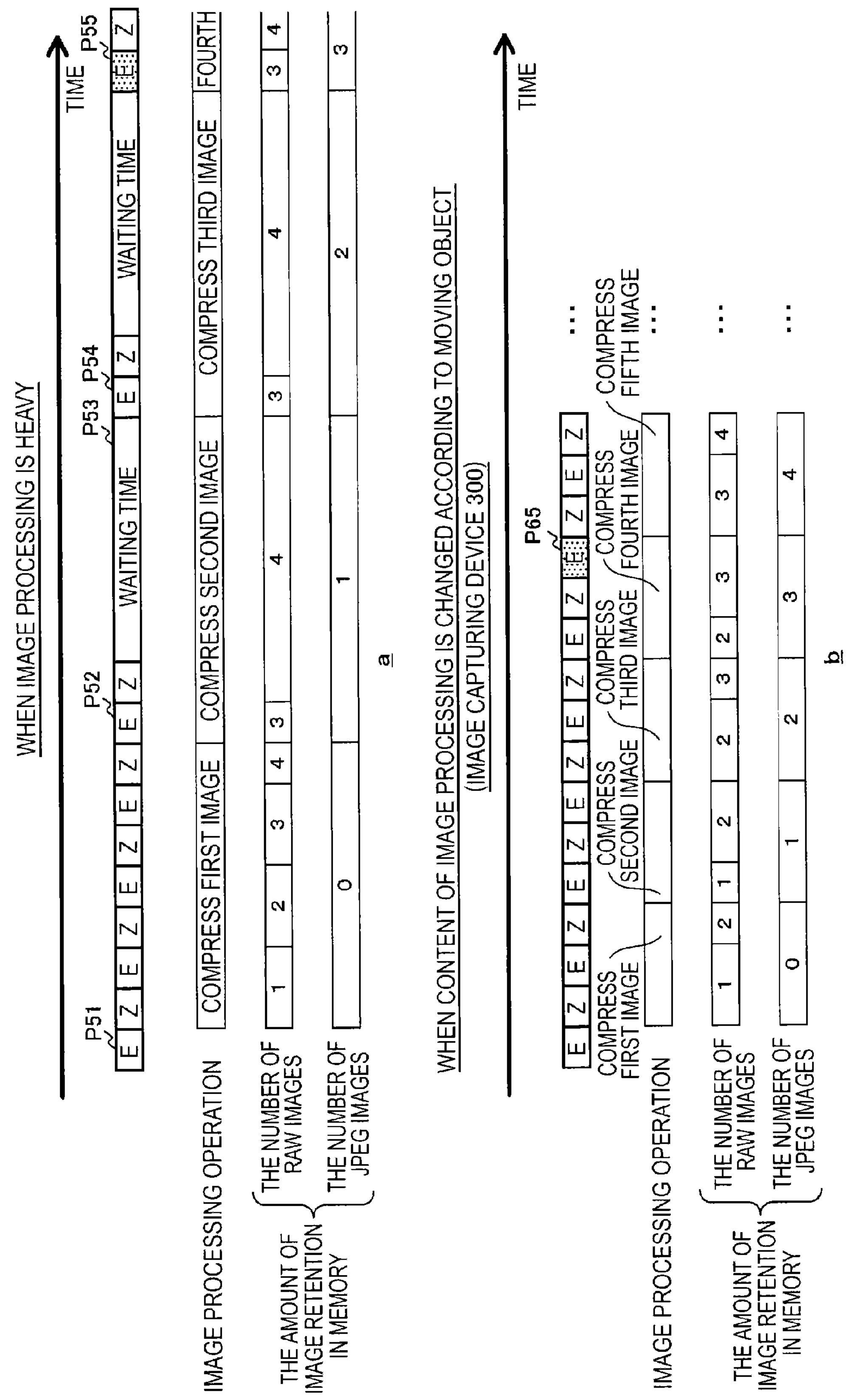
FIG. 11
WHEN IMAGE PROCESSING IS HEAVY
TIME
P51
P52
P53
P54
P55
WAITING TIME
WAITING TIME
IMAGE PROCESSING OPERATION
COMPRESS FIRST IMAGE
COMPRESS SECOND IMAGE
COMPRESS THIRD IMAGE
FOURTH
THE AMOUNT OF IMAGE RETENTION IN MEMORY
THE NUMBER OF RAW IMAGES
THE NUMBER OF JPEG IMAGES
a
WHEN CONTENT OF IMAGE PROCESSING IS CHANGED ACCORDING TO MOVING OBJECT
(IMAGE CAPTURING DEVICE 300)
TIME
P65
COMPRESS FIRST IMAGE
COMPRESS SECOND IMAGE
COMPRESS THIRD IMAGE
COMPRESS FOURTH IMAGE
COMPRESS FIFTH IMAGE
IMAGE PROCESSING OPERATION
THE AMOUNT OF IMAGE RETENTION IN MEMORY
THE NUMBER OF RAW IMAGES
THE NUMBER OF JPEG IMAGES
b

IMAGE CAPTURE CONTROLLING DEVICE, IMAGE CAPTURE CONTROLLING METHOD, AND PROGRAM

TECHNICAL FIELD

The present technology relates to an image capture controlling device, in particular relates to an image capture controlling device and an image capture controlling method that controls a consecutive zoom shooting, and a program that causes a computer to perform the method.

BACKGROUND ART

In recent years, image capturing devices such as digital still cameras for capturing a subject such as a person to generate a captured image, and recording this generated captured image, have come into widespread use. It is noted that, in such an image capturing device, in order to enhance a user's convenience, various image capturing methods have been proposed.

For example, an image capturing device is proposed that performs an image capturing method (consecutive zoom shooting) in which image capturing and zooming are repeated for a consecutive shooting to obtain a plurality of images having different zoom magnifications (e.g., refer to Patent Literature 1).

CITATION LITERATURE

Patent Literature

Patent Literature 1: JP 2005-301269A

SUMMARY OF INVENTION

Technical Problem

With the above-described conventional art, a consecutive zoom shooting can be easily performed. However, with the above-described conventional art, obtaining an image intended by a user may be difficult because zooming and capturing are only repeated up to a predetermined zooming position after the consecutive zoom shooting is started.

That is, it is important for a consecutive zoom shooting to properly reflect an intention of a user or the state of a subject.

The present technology is made in view of such a circumstance, and has an object to properly perform a consecutive zoom shooting.

Solution to Problem

The present technology has been achieved in order to solve the above-mentioned problems, and the first aspect is to provide an image capture controlling device including a controlling unit that analyzes a subject of a consecutive zoom shooting on the basis of an image generated before starting the consecutive zoom shooting, the consecutive shooting being performed by repeating a zooming operation and an image capturing operation, and that performs a control to perform the consecutive zoom shooting using a transition condition of a zoom magnification determined on the basis of a result of the analysis, an image capture controlling method, and a program. This yields the effect of analyzing the subject of the consecutive zoom shooting on the basis of an image generated in the image capturing operation before starting the consecutive zoom shooting, and performing a control to perform the consecutive zoom shooting using the transition condition of a zoom magnification determined on the basis of this analysis result.

Further, in the first aspect, the controlling unit may determine a transition condition of the zoom magnification depending on a moving speed of a moving object included in the subject. This yields the effects of determining the transition condition of the zoom magnification in accordance with the moving speed of the moving object included in the subject.

Further, in the first aspect, the controlling unit may determine a transition condition of the zoom magnification in accordance with a moving speed of a focused subject specified by a user. This yields the effects of determining the transition condition of a zoom magnification in accordance with the moving speed of the focused subject specified by a user.

Further, in the first aspect, the controlling unit may determine a moving distance of a zoom lens at a time of the zooming operation as a transition condition of the zoom magnification. This yields the effects of determining the moving distance of the zoom lens in the zooming operation.

Further, in the first aspect, the controlling unit may determine a transition condition of the zoom magnification by changing a processing content of image processing performed while the consecutive zoom shooting is performed. This yields the effects of determining the transition condition of the zoom magnification by changing the processing content of image processing performed while the consecutive zoom shooting is performed.

Further, in the first aspect, the controlling unit may reduce a load of image processing performed in a course of subjecting a RAW image generated through the consecutive zoom shooting to compression coding to generate an image, as a moving speed of a moving object included in the subject increases to determine a transition condition of the zoom magnification. This yields the effects of reducing the load of image processing performed in the course of subjecting the RAW image to compression coding to generate an image, as the moving speed of the moving object included in the subject increases for performing the consecutive zoom shooting.

Further, in the first aspect, the controlling unit may perform a control to perform the consecutive zoom shooting in an image capturing instruction input period during which an image capturing instruction is input by a user. This yields the effects of performing the consecutive zoom shooting in a period during which an image capturing instruction is input by a user.

Further, in the first aspect, the controlling unit may perform the control regarding a period during which a shutter release button is pressed as the image capturing instruction input period. This yields the effects of performing the consecutive zoom shooting in a period during which a shutter release button is pressed.

Further, in the first aspect, the controlling unit may terminate the consecutive zoom shooting irrespective of whether the shutter release button is pressed or not, when a zoom lens driven in the consecutive zoom shooting reaches an end portion of a driving range of the zoom lens. This yields the effects of finishing the consecutive zoom shooting when the zoom lens driven in the consecutive zoom shooting reaches an end portion of the driving range of the zoom lens.

Advantageous Effects of Invention

According to the present technology, the superior effect that a consecutive zoom shooting can be properly performed can be achieved.

BRIEF DESCRIPTION OF DRAWINGS

FIG. 2 is a diagram schematically illustrating the relationship between the operational transition of the image capturing device 100 and the transition of a captured image at the time of capturing performed in the consecutive zoom shooting, in the first embodiment of the present technology.

FIG. 3 is a diagram schematically illustrating a consecutive zoom shooting by the image capturing device 100 of the first embodiment of the present technology and a consecutive zoom shooting by another image capturing device.

FIG. 6 is a diagram illustrating one example of a zooming interval that is set in accordance with the moving speed of a moving object in the image capturing device 300 of the second embodiment of the present technology.

FIG. 9 is a diagram illustrating one example of a display screen displayed on a displaying part 172 when a user specifies a focused subject, in a third embodiment of the present technology.

FIG. 11 is a diagram illustrating an example of changing the content of image processing to make the increasing speed of a zoom magnification higher at the time of performing a consecutive zoom shooting to a moving object by an image capturing device (image capturing device 300) of a fourth embodiment of the present technology.

DESCRIPTION OF EMBODIMENTS

Hereafter, modes (hereafter, referred to as embodiments) for carrying out the present technology will be described. The description will be made in the following order.

1. First embodiment (Image capturing control: Example in which a series of images having less incongruity are obtained by a consecutive zoom shooting)
2. Second embodiment (Image capturing control: Example in which a zooming interval of a consecutive zoom shooting is determined according to a moving object included in subjects)
3. Third embodiment (Image capturing control: Example in which a zooming interval of a consecutive zoom shooting is determined depending on the movement of a focused subject specified by a user)
4. Fourth embodiment (Image capturing control: Example in which a consecutive zoom shooting is performed using lightweight image processing when the processing time of image processing is longer than the moving time of a zoom lens)

1. First Embodiment

Example of Functional Configuration of Image Capturing Device

Figure 1:
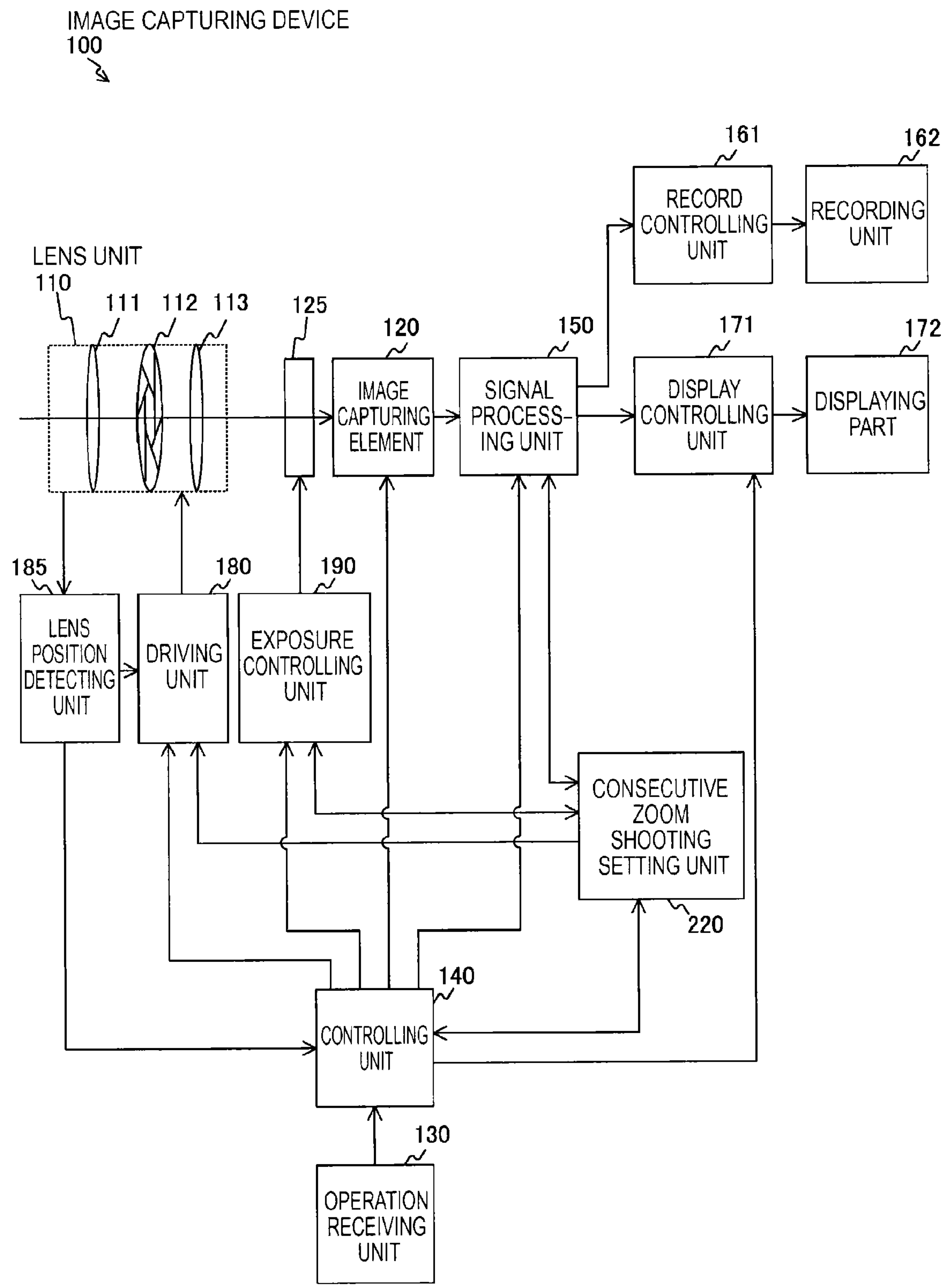
FIG. 1 is a block diagram illustrating one example of the functional configuration of an image capturing device 100 in a first embodiment of the present technology.

FIG. 1 is a block diagram illustrating an example of the functional configurations of an image capturing device 100 in a first embodiment of the present technology.

The image capturing device 100 is a device that captures an image of a subject to generate image data (digital data), and records this generated image data as an image content (still image content or movie content) (e.g., compact digital camera). Note that, in FIG. 1, some of the functional configurations of the image capturing device 100 will be omitted, which are not frequently used when images are captured in a mode (consecutive zoom shooting mode) in which the capturing is performed at predetermined intervals while zooming is performed, to obtain a plurality of captured images having different zoom magnifications.

The image capturing device 100 includes a lens unit 110, a shutter 125, an image capturing element 120, an operation receiving unit 130, a controlling unit 140, a signal processing unit 150, a record controlling unit 161, a recording unit 162, a display controlling unit 171, and a displaying part 172. In addition, the image capturing device 100 includes a consecutive zoom shooting setting unit 220, a driving unit 180, a lens position detecting unit 185, and an exposure controlling unit 190.

The lens unit 110 is a lens for condensing light from a subject (subject light). This lens unit 110 includes a zoom lens 111, an aperture 112, and a focus lens 113.

The zoom lens 111 is driven by the driving unit 180 and moved in an optical axis direction to change a focal distance, adjusting the magnification of the subject included in a captured image. The current position of this zoom lens 111 in a lens barrel is detected by the lens position detecting unit 185. Note that this detected current position is used for, for example, calculating a current zoom magnification, or the like.

The aperture 112 is a shield for adjusting the amount of incident light that is incident on the image capturing device 100 from a subject.

The focus lens 113 is a lens for adjusting the focus by being moved in the optical axis direction. The current position of this focus lens 113 in the lens barrel is detected by the lens position detecting unit 185. Note that this detected current position is used for, for example, calculating the moving destination of the lens in focus control, or the like.

The shutter 125 is for controlling an exposure time of the image capturing element 120 using a screen body moving in a vertical direction.

The image capturing element 120 is for performing photoelectric conversion of the incident light from a subject into electric signals, and receives the incident light from the subject to generate the electric signals. In addition, the image capturing element 120 is implemented by, for example, a complementary metal oxide semiconductor (CMOS) sensor and a charge coupled device (CCD) sensor.

The operation receiving unit 130 is for receiving an operation by a user. For example, upon receiving a selecting operation to set a consecutive zoom shooting, this operation receiving unit 130 provides a signal indicating the selecting operation to the controlling unit 140. In addition, when a shutter release button (not shown) is pressed, the operation receiving unit 130 provides a signal indicating the pressing to the controlling unit 140.

The controlling unit 140 is for controlling the operations of units of the image capturing device 100. Note that FIG. 1 illustrates only main signal lines, and the others are omitted. For example, when the shutter release button is pressed in a state where the image capturing device 100 operates in a mode to perform a consecutive zoom shooting (consecutive zoom shooting mode), this controlling unit 140 starts the consecutive zoom shooting. When starting the consecutive zoom shooting, this controlling unit 140 first causes an image (setting-purposed image) to be obtained, which is used for determining image capturing conditions at the time of the consecutive zoom shooting. The controlling unit 140 then causes the consecutive zoom shooting setting unit 220 to determine the image capturing conditions (focus position, exposure, and white balance (WB)) at the time of capturing an image in the consecutive zoom shooting on the basis of this image. Thereafter, the controlling unit 140 controls the units such that the consecutive zoom shooting is performed on the basis of the determined conditions while the shutter release button is pressed, to capture a plurality of images. Note that the consecutive zoom shooting is continued until the zoom lens reaches a telephoto end (farthest telephoto), or the pressing the shutter release button ends. Note that the description of the consecutive zoom shooting will be made with reference to FIG. 2, and is therefore omitted here.

The signal processing unit 150 subjects electric signals provided from the image capturing element 120 to predetermined signal processing to correct an image signal. This signal processing unit 150, for example, converts the electric signals provided from the image capturing element 120 into digital electric signals (pixel values), and thereafter performs signal processing such as black level correction, defect correction, shading correction, color mixture correction, white balance correction, $\gamma$ correction, and a demosaic processing. Out of the signals of the captured images (image signals) subjected to these types of correction processing, the signal processing unit 150 provides an image signal (e.g., the signals of captured images captured through the consecutive zoom shooting) to be recorded in the recording unit 162 to the record controlling unit 161. In addition, out of the captured images subjected to these types of correction processing, the signal processing unit 150 provides an image signal to be displayed on the displaying part 172 (e.g., the signal of a live view image) to the display controlling unit 171. In addition, at the time of starting the consecutive zoom shooting, the signal processing unit 150 provides a setting-purposed image to the consecutive zoom shooting setting unit 220.

The record controlling unit 161 is for performing a control of recording an image content (image file) in the recording unit 162. For example, when the image signal of a captured image captured in the consecutive zoom shooting is provided from the signal processing unit 150, this record controlling unit 161 subjects this image signals to compressing processing (e.g., joint photographic experts group (JPEG) system). Then, the record controlling unit 161 provides data subjected to this compressing processing (recorded image data) to the recording unit 162 and causes the recording unit 162 to record the data.

The recording unit 162 is for recording the recorded image data provided from the record controlling unit 161, as an image content. For example, as this recording unit 162, a removable storage medium (one or more storage media) such as a recording disk medium (digital versatile disk (DVD) or the like), and a semiconductor memory (memory card or the like) can be used. In addition, these storage medium may be configured to be incorporated in the image capturing device 100, or may be configured to be detachable from the image capturing device 100. The display controlling unit 171 is for controlling display on the displaying part 172. When an image signal is provided from the signal processing unit 150, this display controlling unit 171 generates an image to be displayed on the basis of this image signal, and provides data on this generated image (data on the image to be displayed) to the displaying part 172 to display the image to be displayed.

The displaying part 172 is for displaying various images on the basis of the data on the image to be displayed provided from the display controlling unit 171. This displaying part 172 is implemented by, for example, a color liquid crystal panel, and displays captured images, various setting screens, or the like.

The consecutive zoom shooting setting unit 220 is, in the case of performing a consecutive zoom shooting, for making settings of the units of the image capturing device 100 such that a plurality of images are obtained in the consecutive zoom shooting. For example, in the consecutive zoom shooting mode, when the shutter release button is pressed, the consecutive zoom shooting setting unit 220 first determines image capturing conditions of the consecutive zoom shooting (exposure, white balance, and the like) on the basis of the setting-purposed images. In addition, the consecutive zoom shooting setting unit 220 determines a transition condition of a zoom magnification (the degree of change in the zoom magnification) in the consecutive zoom shooting. The consecutive zoom shooting setting unit 220 determines a zooming interval at the time of the consecutive zoom shooting as the degree of change in the zoom magnification, and provides the zooming interval to the driving unit 180. Note that, in the first embodiment of the present technology, an example in which the consecutive zoom shooting is performed at predetermined zooming intervals (preset zooming intervals) will be described. An example in which zooming intervals are set according to a subject will be described in second and third embodiments of the present technology.

The consecutive zoom shooting setting unit 220 provides information on the determined image capturing conditions to the signal processing unit 150, the driving unit 180, and the exposure controlling unit 190, and makes settings of the units such that the consecutive zoom shooting is performed under the determined conditions. Note that the consecutive zoom shooting setting unit 220 and the controlling unit 140 are an example of controlling unit described in claims.

The driving unit 180 is for driving the lenses in the lens unit 110. This driving unit 180 drives the zoom lens 111 by, for example, a zooming interval provided from the consecutive zoom shooting setting unit 220 between an exposure and another exposure in the consecutive zoom shooting.

The lens position detecting unit 185 is for detecting the positions of the zoom lens 111 and the focus lens 113 in the lens barrel. This lens position detecting unit 185 provides information on the detected position of the focus lens 113 and information on the detected position of the zoom lens 111 to the driving unit 180. In addition, the lens position detecting unit 185 provides the information on the position of the zoom lens 111 to the controlling unit 140.

The exposure controlling unit 190 is for controlling an exposure time of the image capturing element 120 by controlling timings of opening/closing the shutter 125. This exposure controlling unit 190 calculates an appropriate amount of light on the basis of the image data provided from the image capturing element 120 (automatic exposure (AE)). Then, the exposure controlling unit 190 calculates the exposure time of the image capturing element 120 on the basis of the calculated amount of light, and opens/closes the shutter 125 on the basis of the calculated exposure time so as to control the exposure time. In addition, when the capturing is performed in the consecutive zoom shooting, the exposure controlling unit 190 opens/closes the shutter 125 on the basis of information on an exposure time in the image capturing conditions of the consecutive zoom shooting provided from the consecutive zoom shooting setting unit 220 so as to control the exposure time for each capturing in the consecutive zoom shooting.

Next, a consecutive zoom shooting performed by the image capturing device 100 will be described with reference to FIG. 2.

Example of Operational Transition in Consecutive Zoom Shooting Performed by Image Capturing Device FIG. 2 is a diagram schematically illustrating the relationship between the operational transition of the image capturing device 100 and the transition of a captured image at the time of capturing in the consecutive zoom shooting, in the first embodiment of the present technology.

This FIG. 2 illustrates the operating states of the shutter release button by a user and the operating states of the image capturing device 100 on a common time axis. Note that the length of a period illustrated as each operating state is schematic, and does not illustrate a ratio of the time length of each period.

In addition, FIG. 2 illustrates a plurality of images (images 221 to 223) to depict compositions in a plurality of images captured through the consecutive zoom shooting.

As shown in FIG. 2, until the shutter release button is pressed, the image capturing device 100 is in an operating state where a live view image (a real time image of the subject image the light of which is received by the image capturing element) is displayed on a display screen (the displaying part 172) (live view operation). Then, when the shutter release button is pressed, the image capturing device 100 starts the operation of the consecutive zoom shooting.

When the shutter release button is pressed, the image capturing device 100 captures an image of the subject to obtain an image (setting-purposed image) used to determine the settings of the consecutive zoom shooting. In FIG. 2, the period for generating this setting-purposed image is illustrated as a setting-purposed image preparation period P1. Note that, in FIG. 2, for the purpose of description, an example in which a new image is obtained after the live view operation and used as the setting-purposed image is described, but the latest image obtained in the live view operation may be used as the setting-purposed image.

Then, on the basis of this obtained setting-purposed image, image capturing conditions (exposure and white balance) at the time of performing the consecutive zoom shooting are determined by the consecutive zoom shooting setting unit 220 (condition calculating period P2 in FIG. 2). Note that the image capturing conditions determined on the basis of the setting-purposed image are used until this consecutive zoom shooting is finished.

Thereafter, when the determination of the image capturing conditions is finished, the image capturing device 100 performs an exposure to generate a first image to be recorded (exposure period P3 in FIG. 2). The subject is thereby captured on the basis of the determined image capturing conditions.

Then, when the exposure is finished, the image capturing device 100 moves the zoom lens toward a tele side (telephoto side) by a predetermined zooming interval (zooming period P4 in FIG. 2). When the movement of this zoom lens is finished, the image capturing device 100 performs an exposure to capture a second image to be recorded on the basis of the exposure and the white balance determined in the condition calculating period P2 (exposure period P5 in FIG. 2).

Thereafter, when the exposure of the second image is finished, the image capturing device 100 moves the zoom lens toward the tele side by the predetermined zooming interval (zooming period P6 in FIG. 2). The image capturing device 100 continues such repetition of the exposure period and the zooming period until the zoom lens reaches the telephoto end (farthest telephoto) or until pressing the shutter release button ends. FIG. 2 illustrates an example in which four images to be recorded are captured before pressing the shutter release button ends.

Note that the image capturing device 100 captures images using the image capturing conditions determined on the basis of the setting-purposed image at the times of capturing the second and subsequent images to be recorded. FIG. 2 illustrates an example in which pressing the shutter release button ends immediately after the fourth capturing is performed.

By performing the consecutive zoom shooting in such a manner, as illustrated in the images 221 to 223, it is possible to obtain a plurality of images having different zoom magnifications. In addition, since the same image capturing conditions (image capturing conditions determined on the basis of the setting-purposed image) are used for all the image capturing conditions at the times of capturing the plurality of images, it is possible to obtain a series of images having the same coloring and less incongruity.

In addition, by starting the consecutive zoom shooting with a zoom magnification at the timing when a user presses the shutter release button, and by finishing the consecutive zoom shooting at the timing when pressing the shutter release button ends, it is possible to reduce the number of useless captures that generate images that the user does not need. In addition, by starting the consecutive zoom shooting with the zoom magnification at the timing when the shutter release button is pressed, it is possible to obtain at least one image that reflects a composition desired by the user.

Advantageous Effect Example

FIG. 3 is a diagram schematically illustrating a consecutive zoom shooting by the image capturing device 100 of the first embodiment of the present technology and a consecutive zoom shooting by another image capturing device.

FIG. 3*a* illustrates images (images 251 and 252) captured in the consecutive zoom shooting by the other image capturing device together with an axis indicating the position of the zoom lens. Note that the image 251 illustrates an image captured at the time of starting the consecutive zoom shooting, and the image 252 illustrates an image captured at the time of finishing the consecutive zoom shooting. In the other image capturing device, image capturing conditions are set for each of a plurality of images captured in the consecutive zoom shooting. That is, the exposure and the white balance are different for each image. Thus, as illustrated in the images 251 and 252, the coloring of image may differ for each image.

In addition, in the other image capturing device, because the consecutive zoom shooting is performed until the zoom magnification reaches a predetermined zoom magnification, the number of useless captures is increased.

FIG. 3*b* illustrates images (images 253 and 254) captured in the consecutive zoom shooting by the image capturing device 100 together with an axis indicating the position of the zoom lens. Note that the image 253 is a captured image having a magnification same as that of the image 251 in FIG. 3*a*, and the image 254 is a captured image having a magnification same as that of the image 252 in FIG. 3*a*. As illustrated in FIG. 2, in the consecutive zoom shooting by the image capturing device 100, a plurality of images are captured using the image capturing conditions that are determined using the setting-purposed image. For this reason, a series of images captured in the consecutive zoom shooting have the same coloring, and it is possible to obtain the series of images having less incongruity.

Operation Example of Image Capturing Device

Next, the operations of the image capturing device 100 in the first embodiment of the present technology will be described with reference to the drawing.

Figure 4:
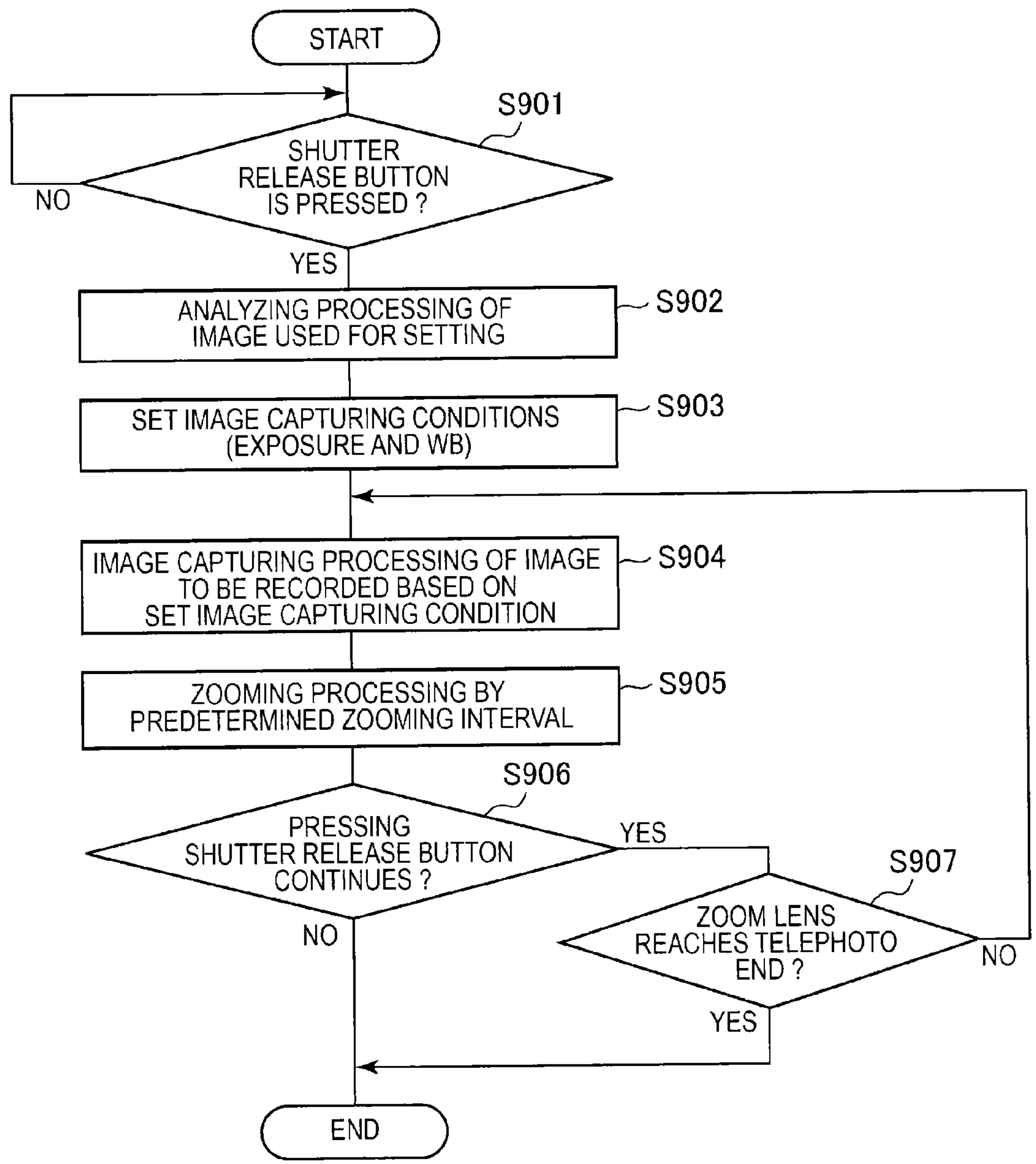
FIG. 4 is a flow chart illustrating an example of an image capturing processing procedure at the time of capturing in a consecutive zoom shooting mode of the image capturing device 100 of the first embodiment of the present technology.

FIG. 4 is a flow chart illustrating an example of an image capturing processing procedure at the time of capturing in a consecutive zoom shooting mode of the image capturing device 100 of the first embodiment of the present technology. First, the controlling unit 140 determines whether the shutter release button is pressed or not (step S901). Then, when the shutter release button is determined not to be pressed (step S901), the controlling unit 140 waits for the shutter release button to be pressed.

In contrast, when the shutter release button is determined to be pressed (step S901), the image of the subject is captured, and an image (setting-purposed image) used to determine the image capturing conditions of the consecutive zoom shooting is generated, and the subject is analyzed (step S902). Then, the image capturing conditions of the consecutive zoom shooting are determined by the consecutive zoom shooting setting unit 220 on the basis of this analysis result (step S903). Thereafter, an exposure is performed on the basis of the determined image capturing conditions, and an image to be recorded is captured (step S904).

Subsequently, zooming processing is performed in which the zoom lens 111 is driven toward the tele side by a predetermined zooming interval (step S905). Thereafter, the controlling unit 140 determines whether pressing the shutter release button is continued or not (step S906). Then, when pressing the shutter release button is determined not to be continued (step S906), the image capturing processing procedure is finished.

In contrast, when pressing the shutter release button is determined to be continued (step S906), the controlling unit 140 determines whether the zoom lens 111 reaches the telephoto end (tele end) or not (step S907). Then, when the zoom lens 111 is determined to reach the telephoto end (step S907), the image capturing processing procedure is finished.

Note that, when the zoom lens is determined not to reach the telephoto end (step S907), the flow returns to step S904, and the next image to be recorded is created.

In such a manner, according to the first embodiment of the present technology, by generating a plurality of captured images in the consecutive zoom shooting on the basis of the image capturing conditions (exposure time and white balance) that are determined immediately before starting the consecutive zoom shooting, the plurality of images in the consecutive zoom shooting can be obtained in the same conditions. It is thereby possible to cause a series of images to have the same coloring, and to obtain the series of images having less incongruity. In addition, by finishing the consecutive zoom shooting at the timing when pressing the shutter release button ends, it is possible to reduce the number of useless captures that a user does not need. That is, according to the first embodiment of the present technology, it is possible to properly perform the consecutive zoom shooting.

Note that, in the first embodiment of the present technology, although there is described the case where the zoom lens is moved toward the telephoto end side (zoom in) in the consecutive zoom shooting, the first embodiment can be implemented in a similar manner also in the case where the consecutive zoom shooting is performed in a reverse zooming direction (zoom out).

In addition, in the first embodiment of the present technology, there is described the example in which the consecutive zoom shooting is started when the shutter release button is depressed (full pressed). In the case of an image capturing device in which a focus is adjusted by a half press of a shutter release button and a consecutive shooting is started by a full press thereof, image capturing conditions of the consecutive zoom shooting may be determined from a live view image that is captured in the state of half press, and capturing an image to be recorded may be started by a full press. That is, step S902 and step S903 of the flow chart in FIG. 4 may be performed by the half press of the shutter release button, and step S904 and the subsequent steps may be performed by the full press of the shutter release button.

2. Second Embodiment

In the first embodiment of the present technology, there is described the example in which, the consecutive zoom shooting setting unit 220 determines an exposure and a white balance as the image capturing conditions of the consecutive zoom shooting. That is, in the first embodiment of the present technology, according to a subject at a timing when pressing the shutter release button is started, the exposure and the white balance of a plurality of images in the consecutive zoom shooting are determined.

Note that, in the first embodiment of the present technology, the zoom lens is driven on the basis of the predetermined zooming interval. If, also with respect to this zooming interval, an appropriate interval is configured to be set according to a subject at a timing when pressing the shutter release button is started, a likelihood of obtaining a plurality of images that a user needs through a consecutive zoom shooting is further increased.

Thus, in the second embodiment of the present technology, an example in which a zooming interval is set in accordance with the moving speed a moving object included in a subject will be described with reference to FIG. 5 to FIG. 9.

Functional Configuration Example of Image Capturing Device

Figure 5:
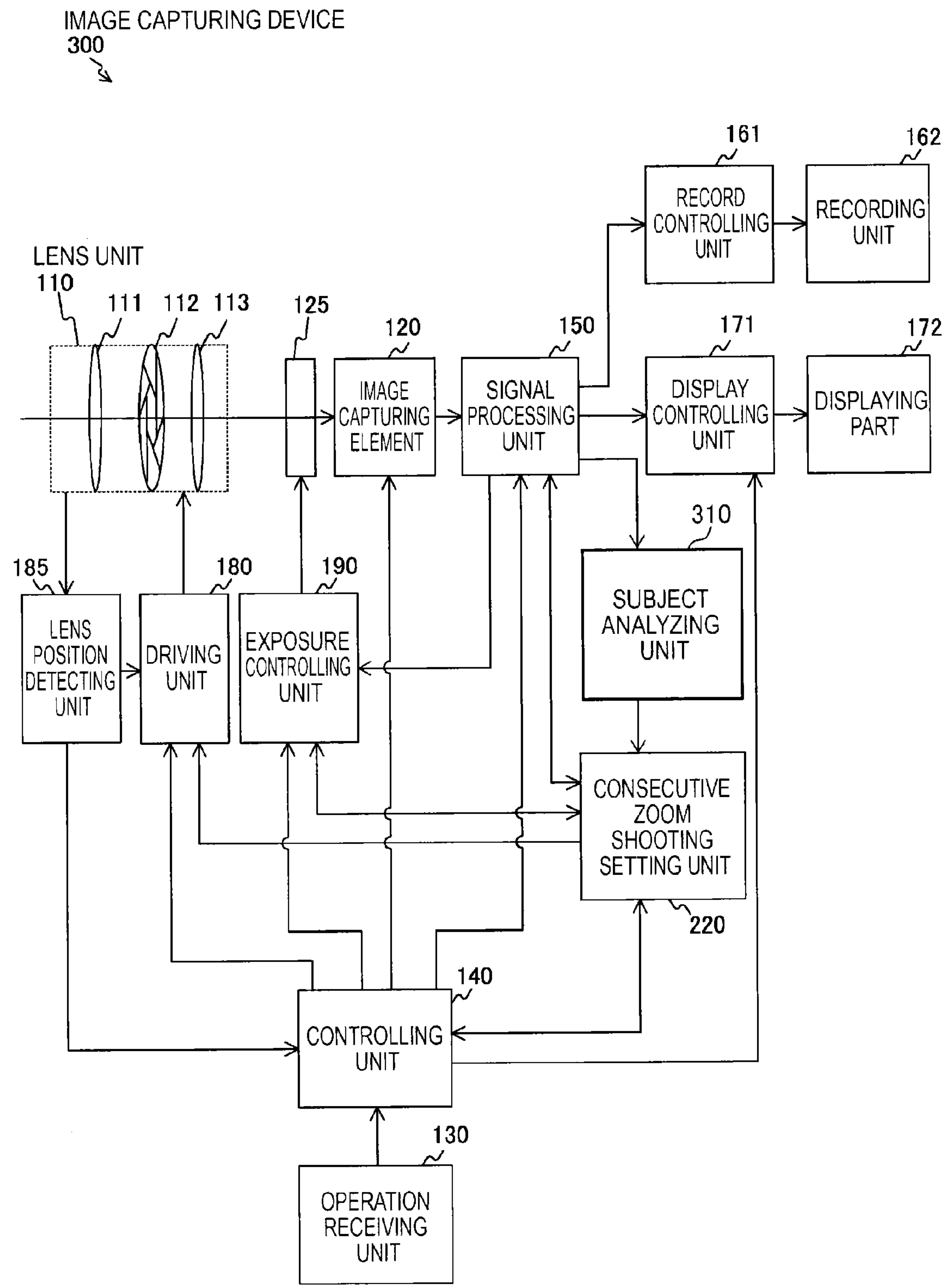
FIG. 5 is a block diagram illustrating one example of the functional configuration of an image capturing device (image capturing device 300) in a second embodiment of the present technology.

FIG. 5 is a block diagram illustrating an example of the functional configuration of an image capturing device (image capturing device 300) in the second embodiment of the present technology.

Note that, the image capturing device 300 illustrated in FIG. 5 is a modification of the image capturing device 100 illustrated in FIG. 1, and the difference therebetween is only in that the image capturing device 300 further includes a subject analyzing unit 310. Therefore, configurations same as those of the image capturing device 100 will be denoted by the same reference numerals and the description thereof will be omitted, and the description will be made here focusing on the subject analyzing unit 310.

The subject analyzing unit 310 is for analyzing a captured image provided form a signal processing unit 150 to analyze objects included in a subject. This subject analyzing unit 310 compares, for example, the setting-purposed image with an image obtained one image before the setting-purposed image (e.g., a live view image) to detect a transition (difference) of the position of the subject, and analyzes whether or not a moving object is included in the subject. Note that there are various possible methods as this method of analyzing a moving object, and for example, the analysis can be performed by using motion vectors detected using a block matching method.

Note that, directions of the movement of a moving object includes an optical axis direction (direction approaching or separating from the image capturing device 300) and orthogonal directions to the optical axis (vertical and horizontal directions in a captured image), and in the second embodiment of the present technology, the description will be made assuming that a moving object moves in the directions orthogonal to the optical axis.

Then, when analyzing that a moving object is included, the subject analyzing unit 310 analyzes the moving speed of the moving object. The subject analyzing unit 310 provides the analysis result to the consecutive zoom shooting setting unit 220.

Note that, in the image capturing device 300 illustrated in FIG. 5, when the moving speed of the moving object is provided from the subject analyzing unit 310, the consecutive zoom shooting setting unit 220 determines a moving distance (zooming interval) on the basis of this moving speed, in a zooming operation in the consecutive zoom shooting. That is, the consecutive zoom shooting setting unit 220 determines the transition condition of a zoom magnification in a consecutive zoom shooting on the basis of this moving speed. Note that the determination of this zooming interval is performed in such a manner that, for example, the consecutive zoom shooting setting unit 220 beforehand holds information indicating the relationship between the moving speed of a moving object and the zooming interval, and the zooming interval is determined on the basis of this information.

Next, an example of a zooming interval that is set when the subject analyzing unit 310 analyzes that the moving object is included in the subject will be described with reference to FIG. 6.

Relationship Example Between Moving Speed of Moving Object and Zooming Interval FIG. 6 is a diagram illustrating one example of a zooming interval that is set in accordance with the moving speed of a moving object in the image capturing device 300 of the second embodiment of the present technology.

FIG. 6*a* illustrates a graph depicting an example in which a zooming interval is made greater in stages as the moving speed of a moving object is increased, with the horizontal axis defined as an axis representing the moving speed of the moving object and with the vertical axis defined as an axis representing the zooming interval. In addition, FIG. 6*b* illustrates, as an example other than FIG. 6*a*, a graph depicting an example in which a zooming interval is gradually made greater as the moving speed of a moving object is increased, with the horizontal axis defined as an axis representing the moving speed of the moving object, and with the vertical axis defined as an axis representing the zooming interval.

As illustrated in FIG. 6*a*, in determining a zooming interval, the consecutive zoom shooting setting unit 220 is configured to hold information in which the range of a moving speed (between a threshold value representing an upper limit speed and a threshold value representing a lower limit speed) is associated with a zooming interval, and a zooming interval is determined on the basis of this information.

In addition, as illustrated in FIG. 6*b*, in determining the zooming interval, the consecutive zoom shooting setting unit 220 is configured to hold a formula to derive a zooming interval from the moving speed of a moving object, and a zooming interval is determined on the basis of this formula.

As illustrated in FIG. 6*a* and FIG. 6*b*, when a zooming interval is made greater with the increase of the moving speed of a moving object, zooming up can be performed before the moving object widely moves in orthogonal directions to the optical axis, which can reduce the difference between images due to the movement of the moving object.

That is, by adjusting a zooming interval in response to an increase of the moving speed of the moving object, it is possible to perform the consecutive zoom shooting with an appropriate setting even to a moving object.

Advantageous Effect Example

Figure 7:
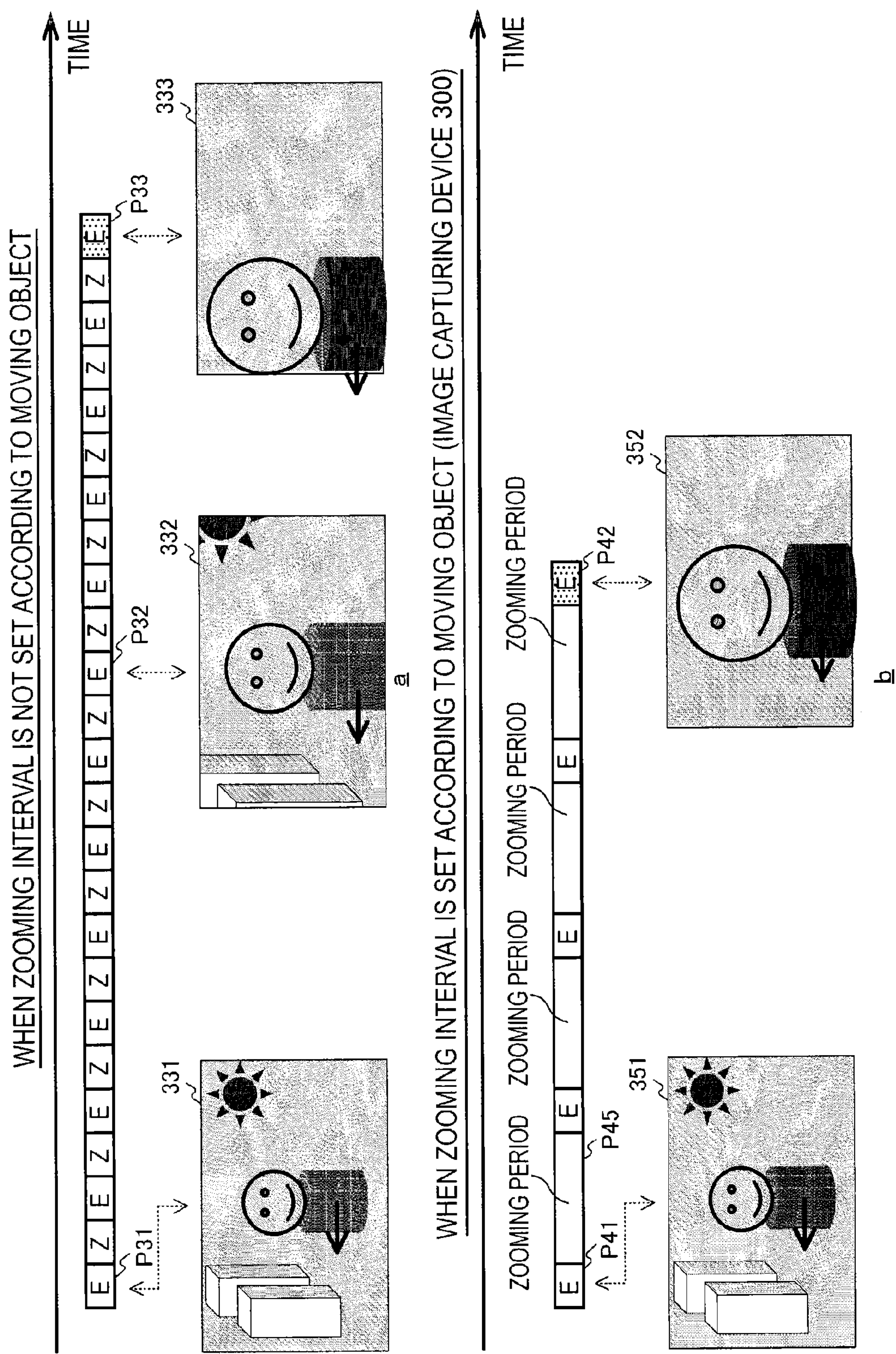
FIG. 7 is a diagram for comparing the consecutive zoom shooting in the case where a zooming interval is set according to a moving object by the image capturing device 300 of the second embodiment of the present technology, with the consecutive zoom shooting in the case where a zooming interval is not set according to a moving object.

FIG. 7 is a diagram for comparing the consecutive zoom shooting in the case where a zooming interval is set according to a moving object by the image capturing device 300 of the second embodiment of the present technology, with the consecutive zoom shooting in the case where a zooming interval is not set according to a moving object.

FIG. 7*a* illustrates the consecutive zoom shooting in the case where a zooming interval is not set according to a moving object, and FIG. 7*b* illustrates the consecutive zoom shooting in the case where a zooming interval is set according to a moving object.

Note that, in FIG. 7, as illustrated by an image 331 in FIG. 7*a* and an image 351 in FIG. 7*b*, the description will be made assuming that, in a state that a person at the center of the image, a building in the vicinity of the left edge of the image, and the sun in the vicinity of the upper right of the image are captured as subjects, the person is moving leftward. In addition, in FIG. 7, it is assumed that the movement of the zoom lens is finished as the zooming period ends. A case where the movement of the zoom lens is finished in the middle of the zooming period will be described as a fourth embodiment of the present technology with reference to FIG. 11, and thus the description of the case will be omitted.

In FIG. 7*a*, the image 331 is illustrated as an image captured with an exposure at the time of starting the consecutive zoom shooting (exposure period P31), and an image 332 is illustrated as an image captured with an exposure after the seventh zooming (exposure period P32). In addition, in FIG. 7*a*, an image 333 is illustrated as an image captured with an exposure after the twelfth zooming (exposure period P33). In the image 332, the person is captured in the vicinity of the center of the image, and the size of the person is not much different from that in the image 331. In contrast, in the image 333, the size of the person is much larger than that in the image 331, and the person is captured in the vicinity of the left edge of the image.

In the image capturing device as illustrated in FIG. 7*a* in which a zooming interval is not set according to a moving object, a zooming interval is set irrespective of the presence/absence of the moving object. There is no problem arising if there is no moving object or the moving speed is low, but if it takes a long time to increase a zoom magnification in the case where a moving object moves fast, the moving object may have already gone away from a position suitable for capturing at a timing when a zoom magnification becomes one that a user desires.

That is, when a moving object is included in the subjects, a misalignment arises between an image captured on the wide-angle side and an image captured on the tele side in the consecutive zoom shooting, causing the subjects to widely move or causing the moving object to go outside the frame. For this reason, an image having a composition that the user desires may not be obtained although the images at the same position are captured.

In contrast, in the image capturing device 300, a zooming interval is set in accordance with the moving speed of a moving object, and as illustrated FIG. 7*b*, it is possible to obtain a series of images having a small misalignment of the moving object and having magnifications that largely change.

In FIG. 7*b*, the image 351 is illustrated as an image captured with an exposure at the time of starting the consecutive zoom shooting (exposure period P41), and an image 352 is illustrated as an image captured with an exposure after the fourth zooming (exposure period P42). Note that, in the case of FIG. 7*b*, the zoom lens is moved by a distance three times the zooming in FIG. 7*a*, in one zooming operation (zooming period P45). That is, the position of the zoom lens in the optical axis direction at the time of capturing the image 352 and the position of the zoom lens in the optical axis direction at the time of capturing the image 333 in FIG. 7*a* are the same (zoom magnification).

As illustrated in FIG. 7*b*, when a larger zooming interval is set as a moving speed of the moving object is higher, the variation of a zoom magnification becomes larger in proportion to the reduction of the number of exposures. In such a manner, the zoom magnification can be increased before the moving object widely moves, and it is thus possible to obtain a series of images having a small misalignment of the moving object and having magnifications that largely change.

Operation Example of Image Capturing Device

Next, the operations of the image capturing device 300 in the second embodiment of the present technology will be described with reference to the drawing.

Figure 8:
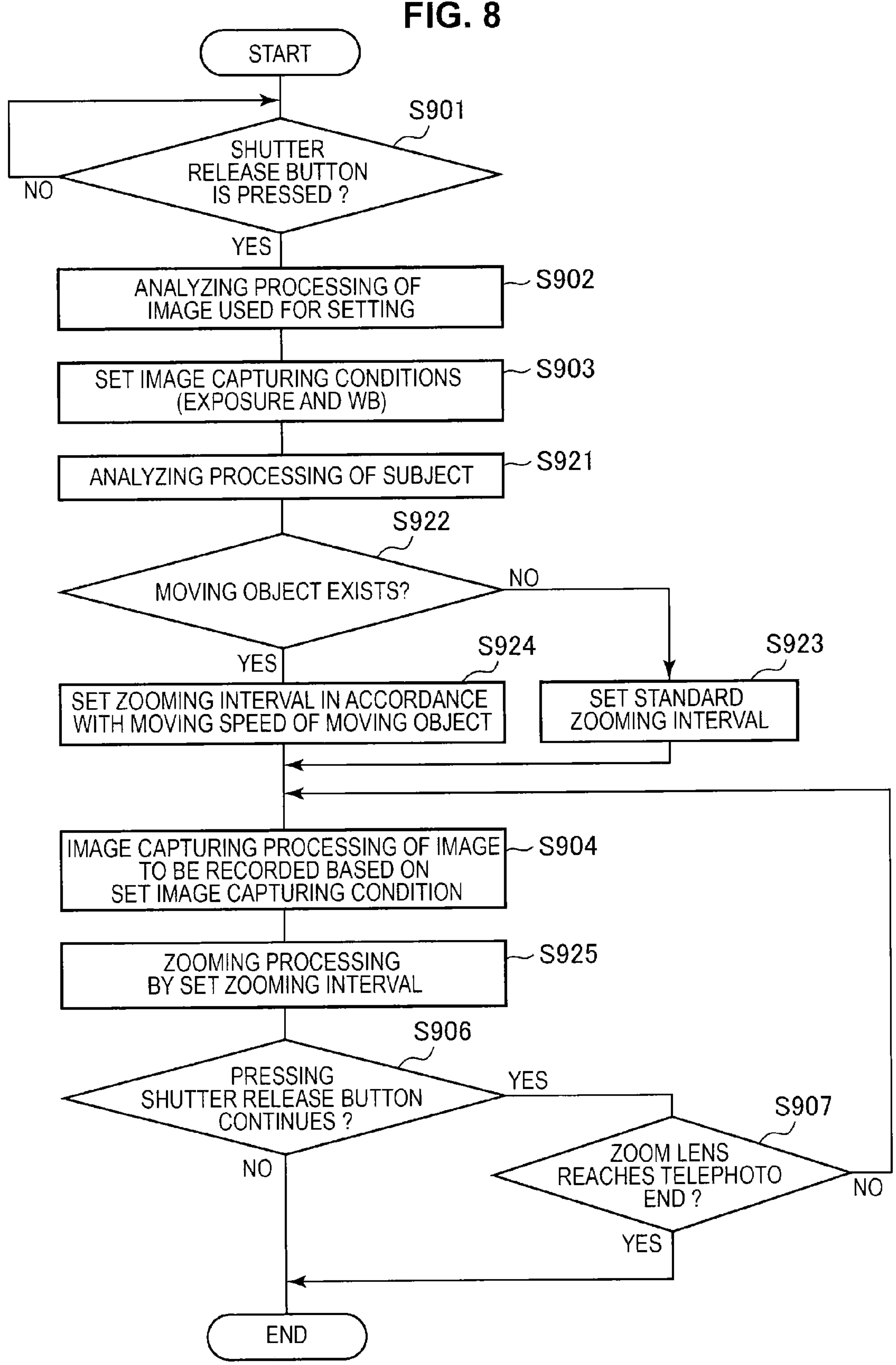
FIG. 8 is a flow chart illustrating an example of an image capturing processing procedure at the time of performing a consecutive zoom shooting according to a moving object, in the image capturing device 300 of the second embodiment of the present technology.

FIG. 8 is a flow chart illustrating an example of an image capturing processing procedure at the time of performing the consecutive zoom shooting according to the moving object, in the image capturing device 300 of the second embodiment of the present technology.

Note that the flow chart illustrated in FIG. 8 is a modification of the flow chart illustrated in FIG. 4, and the difference therebetween is only in that a step, in which the subject is analyzed to detect a moving object and a zooming interval is set in accordance with the moving speed of this moving object, is added. Thus, in the flow chart in FIG. 8, steps same as those of the flow chart in FIG. 4 are denoted by reference numerals same as those in FIG. 4, and the description thereof will be omitted here.

In step S903, when the consecutive zoom shooting setting unit 220 determines the image capturing conditions of consecutive zoom shooting, the subject analyzing unit 310 next performs analyzing processing of subjects (step S921). The subject analyzing unit 310 subsequently determines whether or not a moving object is included in the subjects (step S922).

Then, if it is determined that no moving object is included (step S922), a standard zooming interval (the smallest zooming interval) is set as a zooming interval of the consecutive zoom shooting (step S923), and the flow proceeds to step S904.

In contrast, if it is determined that a moving object is included (step S922), the consecutive zoom shooting setting unit 220 sets a zooming interval in accordance with the moving speed of the moving object (step S924), and the flow proceeds to step S904. Note that step S921 to step S924 are one example of a control procedure described in claims.

In addition, after an image to be recorded is captured in step S904, zooming processing is performed on the basis of the set zooming interval (step S925), and the flow proceeds to step S906.

In such a manner, according to the second embodiment of the present technology, by setting a zooming interval in accordance with the moving speed of a moving object included in subjects, it is possible to obtain a series of images having a small misalignment of the moving object and having magnifications that largely change. That is, according to the second embodiment of the present technology, it is possible to capture images in such a manner that a composition that a user determines at the time of performing the consecutive zoom shooting to the subjects including the moving object is not lost, and to properly perform the consecutive zoom shooting.

Note that, in the second embodiment of the present technology, it is assumed that a moving object moves in the orthogonal direction to the optical axis. However the case where a moving object moves in the optical axis direction is also assumed, and by setting a zooming interval in accordance with the moving speed of a moving object in the optical axis, the consecutive zoom shooting can be properly performed. For example, in the case of the moving object moving in a direction toward the image capturing device, a change in size of moving object becomes large (quickly becomes large), and thus a small zooming interval is set. In addition, in the case of a moving object moving in a direction away from the image capturing device, a change in size of moving object becomes small (slowly become large), and thus a large zooming interval is set. That is, by setting a zooming interval appropriate to a moving direction and a moving speed of a moving object, the consecutive zoom shooting can be properly performed.

3. Third Embodiment

In the second embodiment of the present technology, there is described the example in which a zooming interval is adjusted in the case where a moving object is included in subjects. Thereby, it is possible to perform a consecutive zoom shooting in which a change in a zoom magnification is large while reducing a misalignment between a composition determined by a user and captured images in the consecutive zoom shooting. However, in some situations, there is a case where it is intended to perform a consecutive zoom shooting focusing only on a specified object included in subjects (focused subject). In such a case, if a zooming interval is set according to a moving object other than the focused subject although the focused subject is not a moving object, the consecutive zoom shooting, in which a small number of captured images are obtained with a large zooming interval, may be performed although it is intended to capture many images of the focused subject having different sizes.

Thus, in the third embodiment of the present technology, an example in which the image capturing conditions of a consecutive zoom shooting are determined according to a focused subject specified by a user will be described with reference to FIG. 9 and FIG. 10.

Note that the functional configuration of an image capturing device of the third embodiment of the present technology is similar to the functional configuration of the image capturing device 300 illustrated in FIG. 5, and thus, in the third embodiment of the present technology, the description will be made with reference to the functional configuration of the image capturing device 300 in FIG. 5.

Display Example of Setting Screen for Focused Subject

FIG. 9 is a diagram illustrating one example of a display screen displayed on a displaying part 172 when a user specifies a focused subject, in the third embodiment of the present technology.

Note that, as a method of specifying the focused subject, in FIG. 9*a*, there will be described an example in which a user beforehand selects an object intended to be the focused subject from among a plurality of object types that a subject analyzing unit 310 can recognize. In addition, in FIG. 9*b*, there will be described an example in which, during a live view operation before starting a consecutive zoom shooting, a user specifies an object intended to be a focused subject from among objects displayed in a live view image displayed on the display screen (displaying part 172).

FIG. 9*a* illustrates a display screen that displays an example of a setting screen for specifying the type of the focused subject.

For example, when an item for specifying the type of a focused subject is selected from among setting items relating to the consecutive zoom shooting in a menu screen for setting the image capturing device, a display screen (screen 410) illustrated in FIG. 9*a* is displayed. In this display screen, objects that the subject analyzing unit 310 can recognize are displayed as the types of an object to be a focused subject, from which a user makes a selection to determine the type of an object to be a focused subject. In the screen 410 in FIG. 9*a*, a dog, a car, a person, and a train are displayed as one example of choices.

Note that, the object recognition by the subject analyzing unit 310 is performed by, for example, holding information representing the properties of each object beforehand, and by detecting a subject having the held properties. For example, the subject analyzing unit 310 recognizes an object included in subjects by matching an image indicating the properties of the object (template image) with the captured image.

In a state that this screen 410 is displayed on the displaying part 172, when a user selects an object intended to be focused and determines the selection (pressing an OK button), it is analyzed whether the selected object is included in subjects or not at the time of setting the image capturing conditions of a consecutive zoom shooting performed after the determination. Then, if it is analyzed that the selected object is included, a zooming interval is determined in accordance with the moving speed of the object. Note that if the selected object is included in the subjects but is standing still, or if a moving object included in the subjects is an object of another type, a standard zooming interval (the smallest zooming interval) is set.

FIG. 9*b* illustrates one example of a display screen (screen 420) displayed when a user specifies a focused subject from among objects displayed in a live view image.

Here, it is assumed that the image capturing device 300 includes a liquid crystal panel having a touch panel function. The user touches an object that the user wants to specify as a focused subject, from among objects displayed in the live view image. Then, a frame (frame 421) indicating the focused subject is displayed, and an object in the frame is determined as the focused subject. The screen 420 in FIG. 9*b* illustrates an example in which, in the live view image in which subjects consisting of trees, a car, a person, a dog, and a house are displayed, the user touches the face of the person and the face of the person is set as the focused subject.

In setting the image capturing conditions of a consecutive zoom shooting that is performed in response to pressing a shutter release button after the focused subject is specified, a zooming interval is determined in accordance with the moving speed of a focused subject that is specified by touching, and the consecutive zoom shooting is performed using this determined zooming interval.

Note that, in FIG. 9*b*, for the purpose of the description, the description is made assuming that a liquid crystal panel having a touch panel function is provided in the image capturing device 300, but the embodiment can be implemented in a similar manner also in the case of an image capturing device that is not provided with a touch panel. In this case, a focused subject can be set as with the touch panel by moving a cursor with a D-pad to select an object and by pressing a selecting button.

Operation Example of Image Capturing Device

Next, the operations of the image capturing device in the third embodiment of the present technology will be described with reference to the drawing.

Figure 10:
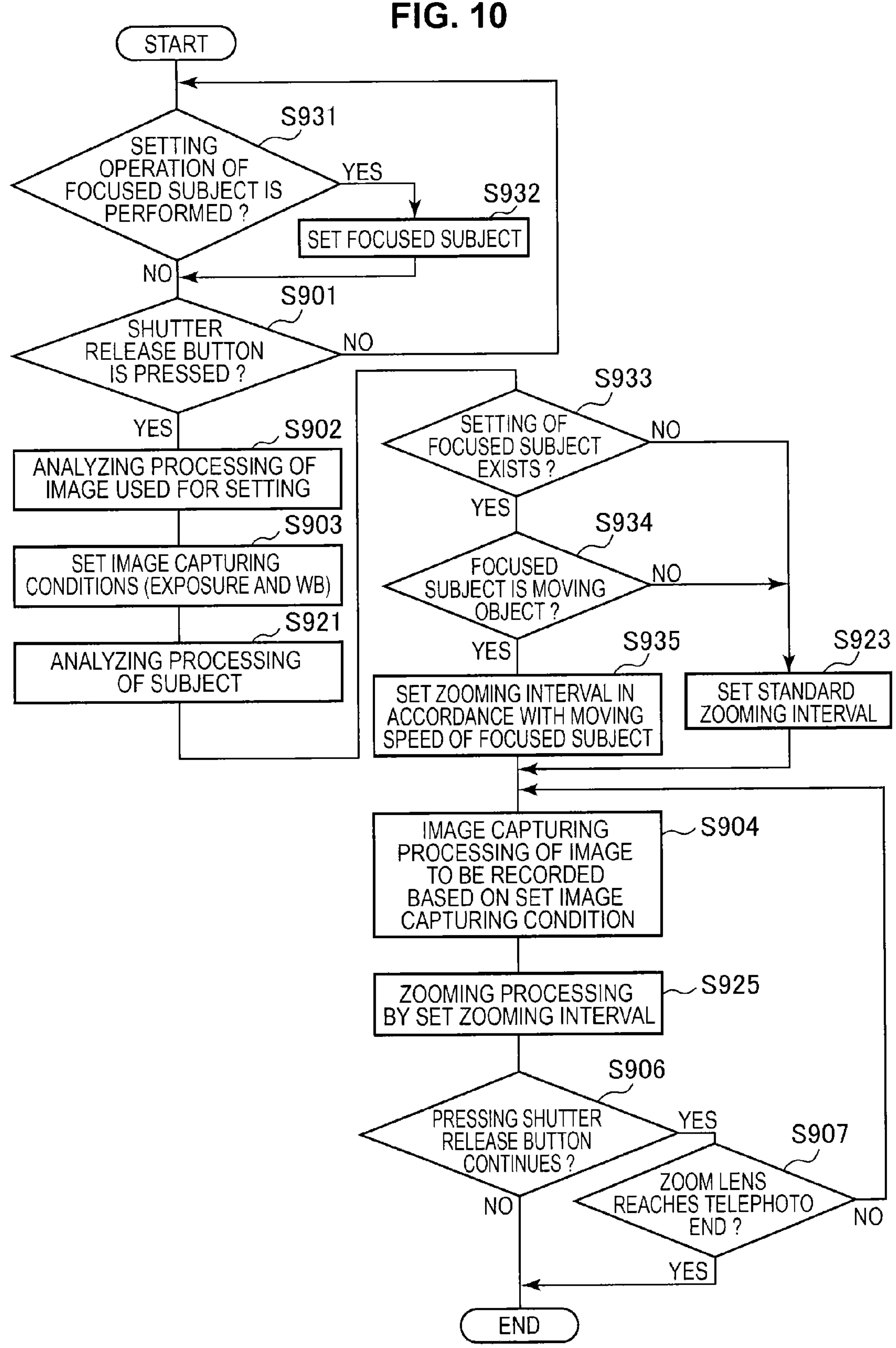
FIG. 10 is a flow chart illustrating an example of an image capturing processing procedure at the time of performing a consecutive zoom shooting according to a focused subject that a user specifies in an image capturing device of the third embodiment of the present technology.

FIG. 10 is a flow chart illustrating an example of an image capturing processing procedure at the time of performing a consecutive zoom shooting according to a focused subject that a user specifies, in the image capturing device of the third embodiment of the present technology.

Note that, the flow chart illustrated in FIG. 10 is a modification of the flow chart illustrated in FIG. 8, and the difference therebetween is only in that a step, in which a focused subject is specified, is added. Thus, in the flow chart in FIG. 10, steps same as those of the flow chart in FIG. 8 are denoted by reference numerals same as those in FIG. 8, and the description thereof will be omitted here.

First, a controlling unit 140 determines whether or not a setting operation for a focused subject is performed (step S931). Then, when it is determined that the setting operation for a focused subject is not performed, the flow proceeds to step S901.

In contrast, when it is determined that the setting operation for a focused subject is performed, a focused subject is set (step S932), and thereafter the flow proceeds to step S901. For example, in the case where the type of an object to be a focused subject is set as illustrated in FIG. 9*a*, the type of an object to be a focused subject is determined through the selection by a user via the display screen illustrated by the screen 410 in FIG. 9*a*. In addition, in the case where an object included in the subjects in the live view image is to be set as a focused subject as illustrated in FIG. 9*b*, an object specified by the user is determined as the focused subject.

In addition, in step S921, when the subject analyzing unit 310 performs analyzing processing of the subjects, the consecutive zoom shooting setting unit 220 determines whether or not the setting of a focused subject exists (step S933). That is, when a focused subject is set in step S932, the setting of a focused subject is determined to exist. Then, when the setting of a focused subject is determined not to exist (step S933), the flow proceeds to step S923.

In contrast, when the setting of a focused subject is determined to exist (step S933), it is determined whether or not the focused subject is a moving object (step S934). Then, when the focused subject is determined not to be a moving object (step S934), the flow proceeds to step S923. Note that the flow proceeds to step S923 also in the case where, in this step S934, the type of an object to be a focused subject is selected in step S932 but the object of the type is not included in subjects.

In addition, when the focused subject is determined to be a moving object (step S934), the consecutive zoom shooting setting unit 220 sets a zooming interval on the basis of the moving speed of the focused subject (step S935).

In such a manner, according to the third embodiment of the present technology, by performing a consecutive zoom shooting according to a focused subject specified by a user, it is possible to properly perform the consecutive zoom shooting.

4. Fourth Embodiment

In the second and third embodiments of the present technology, there are described the examples in which a zooming interval is set in accordance with the moving speed of a moving object. Note that, in the first to third embodiments of the present technology, the description is made without particularly taking into consideration the processing state of images captured while a consecutive zoom shooting is performed. The captured images are once stored in a memory (e.g., dynamic random access memory (DRAM)) provided in the image capturing device, and consecutively stored after being subjected to image processing. Here, if the memory has full occupancy while the consecutive zoom shooting is performed, capturing stops until a memory has a free space. The image capturing interval may be thereby made large, lowering the increasing speed of a zoom magnification. Even if the increasing speed of a zoom magnification is lowered, no problem arises in particular when a subject is a stationary object. However, in the case of capturing an image of a moving object, capturing an image that a user desires may be missed while the capturing stops, since the moving object moves. Thus, it is desirable that a state that the capturing stop does not arise as much as possible in the case of capturing an image of a moving object.

Thus, in the fourth embodiment of the present technology, there will be described an example in which the increasing speed of a zoom magnification is controlled with the processing content of image processing made lightweight in accordance with the speed of a moving object. It is thereby possible to prevent capturing from stopping due to an insufficient free space in a memory, reducing the slowness of increase in a zoom magnification. Note that, the diagram of the functional configuration is similar to that illustrated in FIG. 5, and thus the description will be omitted here, with reference to FIG. 5 instead.

Comparison Example of Operation

FIG. 11 is a diagram illustrating an example of changing the content of image processing to make the increasing speed of a zoom magnification higher at the time of performing a consecutive zoom shooting to a moving object by the image capturing device (image capturing device 300) of the fourth embodiment of the present technology.

FIG. 11*a* illustrates one example of a consecutive zoom shooting in the case where increase of a free space in a memory is slow because the load of the image processing is heavy.

FIG. 11*a* illustrates operation transition (exposure periods, zooming periods, and waiting periods) in a consecutive zoom shooting, an image processing operation representing which number of image is being subjected to the image processing, and the number of images held in a memory in which images are temporarily held (the amount of image retention in the memory), on a common time axis. Note that, in the operation transition, a period, during which neither driving a zoom lens nor an exposure of an image capturing element is performed, is defined as a waiting period. In addition, the amount of image retention in the memory represents the number of RAW images that are raw images before being subjected to the image processing, and the number of JPEG images that are generated by subjecting the RAW images to JPEG compression through the image processing.

Note that it is assumed, for the purpose of the description, that the memory in which images are temporarily held has such a capacity size as to hold up to five RAW images. In addition, it is assumed that a JPEG image has a size about ¼ of that of a RAW image. That is, up to 20 JPEG images can be held if only JPEG images are held in the memory.

In addition, in FIG. 11*a*, it is assumed that generating a JPEG image requires a time length being the sum of three exposure periods and four zooming periods. Note that, this time length is also a period being the sum of four exposure periods and three zooming periods.

Here, there will be described the relationship between an image capturing operation in the case where image processing is heavy and the amount of image retention in the memory. When the first exposure period (exposure period P51) ends, a RAW image generated by this exposure is held in the memory. In addition, compressing processing of this RAW image is started. Then, until the compression of the first RAW image is finished, generated RAW images are held in the memory one after another. Meanwhile, JPEG images are not increased until the compression is completed.

In the timing chart in FIG. 11*a*, the compression of the first RAW image is finished before the fifth exposure (exposure period P52) is started. Thereby, at a timing of the exposure period P52, three RAW images and one JPEG image are held in the memory. In addition, the next compressing processing (generation of the JPEG image of the second image) is started at the time of starting this exposure period P52.

When the exposure period P52 ends, four RAW images and one JPEG image are held in the memory. Since the memory holds five RAW images at most, a new RAW image generated cannot be held until the conversion of the second RAW image to a JPEG image is finished. Thus, an exposure is not performed but awaited until the second RAW image is compressed into a JPEG image (waiting period P53). Then, when the compression of the second RAW image into a JPEG image is completed, three (the third, fourth, and fifth) RAW images and two (the first and second) JPEG images are held in the memory, and thus one new RAW image is allowed to be held. When one new RAW image is allowed to be held, the next (sixth) exposure is performed (exposure period P54). Thereafter, an exposure is awaited until one new RAW image is allowed to be held as well.

In such a manner, in the case where the memory has full occupancy, capturing (exposure) is awaited until the memory has a free space. By reducing this waiting time, the speed of repetition of an exposure and the movement of the zoom lens is increased, and the increasing speed of a zoom magnification can be made higher.

FIG. 11*b* illustrates an example in which a consecutive zoom shooting setting unit 220 of an image capturing device 300 changes the image processing to lightweight image processing, which makes the speed of compressing an image (the speed of generating a JPEG image) higher. FIG. 11*b* illustrates, as with FIG. 11*a*, operation transition in a consecutive zoom shooting, an image processing operation, the amount of image retention in the memory, on a common time axis.

Note that, the capacity size of the memory and the size of an image are similar to those in FIG. 11*a*. In addition, in FIG. 11*b*, it is assumed that a time taken to generate a JPEG image is shorter than that in FIG. 11*a*, and that generating a JPEG image requires a period being the sum of two exposure periods and one zooming period. Note that this time length is also a period being the sum of one exposure period and two zooming periods.

Each period illustrated in FIG. 11*b* is the same as that in FIG. 11*a* except that the time length thereof is different, and therefore the description will be made here focusing on the change of image processing. When determining that it is needed to analyze the moving speed of a moving object and to reduce the load of image processing, the consecutive zoom shooting setting unit 220 changes the mode of the image processing performed until a RAW image is converted into a JPEG image, from the mode (high image quality mode) of normal image processing the process of which is heavy, to the mode of fast image processing the process of which is light (low quality image mode). Thereby, whereas the precision and the like of corrections (e.g., defect correction, white balance correction, and shading correction) are lowered and image quality deteriorates, the speed of the image processing is increased.

For example, in the case of FIG. 11*b*, a waiting period does not occur until the seventh exposure (exposure period P65) is performed. In contrast, in the case of FIG. 11*a*, two waiting periods occur until the seventh exposure (exposure period P55 in FIG. 11*a*) is performed. In such a manner, reducing the load of image processing can prevent a waiting time from occurring and can make the increasing speed of a zoom magnification higher.

In such a manner, according to the fourth embodiment of the present technology, by determining the weight (mode) of image processing in accordance with the moving speed of a moving object, it is possible to set the increasing speed of a zoom magnification appropriate for the moving object. That is, according to the fourth embodiment of the present technology, it is possible to properly perform a consecutive zoom shooting.

Note that, in the fourth embodiment of the present technology, for the purpose of the description, the description is made without taking into consideration the generation of a RAW image (compressed RAW image) in which the amount of data is compressed, but the description is also applied to the case where a compressed RAW image is held in the memory. That is, by making image processing lightweight such that capturing does not stop when the moving speed of a moving object is high, many images can be captured in a short time, and as a result, it is possible to make the increasing speed of a zoom magnification higher.

Note that, the fourth embodiment of the present technology has a small effect on an image capturing device that includes a memory having a very large capacity, but is especially effective for an image capturing device that includes a memory having a small capacity in order to restrain a cost and a power consumption (e.g., an inexpensive compact digital camera).

Note that, in the embodiments of the present technology, the setting of a zooming interval according to a moving object (second and third embodiments) and the setting of the processing content of image processing according to a moving object (fourth embodiment) are described as separated embodiments, but the settings are not limited to these embodiments and both the settings may be performed simultaneously.

In such a manner, according to the embodiments of the present technology, it is possible to properly perform the consecutive zoom shooting.

Note that, in the second and third embodiments of the present technology, there are described the examples in which a zooming interval is adjusted in accordance with the moving speed of a moving object, but the present technology is not limited to these embodiments. For example, by making the sensitivity setting (e.g., ISO sensitivity) of an image capturing device have a high sensitivity to shorten a exposure time, the time of an exposure may be shortened in a consecutive zoom shooting to allow a zoom magnification to widely change in a short time. In addition to the above, in the embodiments of the present technology, the description is made assuming that the repetition is performed at constant zooming intervals determined in accordance with the moving speed of a moving object, but also in the case of gradually making a zooming interval larger, by adjusting a width to be broadened in accordance with the moving speed of a moving object, it is possible to properly perform a consecutive zoom shooting. In such a manner, by properly setting the transition condition of a zoom magnification in accordance with the moving speed of a moving object, it is possible to properly perform a consecutive zoom shooting.

Note that the above-described embodiments are to illustrate examples for embodying the present technology, and a subject matter in the embodiments and an invention-specific subject matter in claims have correspondence relationship with each other. Similarly, an invention-specific subject matter in claims and a subject matter attached with the same name as the invention-specific subject matter in the embodiments of the present technology have correspondence relationship with each other. However, the present technology is not limited to the embodiments, and can be embodied by giving various modifications to the embodiments without departing from the scope of the present technology.

In addition, the processing procedure described in the above embodiments may be considered as a method including the series of procedures, or may be considered as a program for causing a computer to execute the series of procedures or a storage medium in which the program is stored. As this storage medium, for example, a hard disk, a compact disc (CD), a minidisc (MD), a digital versatile disk (DVD), a memory card, a Blu-ray Disc®, or the like may be used.

Additionally, the present technology may also be configured as below.

(1)

An image capture controlling device including a controlling unit that analyzes a subject of a consecutive zoom shooting on the basis of an image generated before starting the consecutive zoom shooting, the consecutive shooting being performed by repeating a zooming operation and an image capturing operation, and that performs a control to perform the consecutive zoom shooting using a transition condition of a zoom magnification determined on the basis of a result of the analysis.

(2)

The image capture controlling device according to (1), wherein the controlling unit determines a transition condition of the zoom magnification depending on a moving speed of a moving object included in the subject.

(3)

The image capture controlling device according to (1), wherein the controlling unit determines a transition condition of the zoom magnification in accordance with a moving speed of a focused subject specified by a user.

(4)

The image capture controlling device according to any one of (1) to (3), wherein the controlling unit determines a moving distance of a zoom lens at a time of the zooming operation as a transition condition of the zoom magnification.

(5)

The image capture controlling device according to any one of (1) to (4), wherein the controlling unit determines a transition condition of the zoom magnification by changing a processing content of image processing performed while the consecutive zoom shooting is performed.

(6)

The image capture controlling device according to (5), wherein the controlling unit reduces a load of image processing performed in a course of subjecting a RAW image generated through the consecutive zoom shooting to compression coding to generate an image, as a moving speed of a moving object included in the subject increases to determine a transition condition of the zoom magnification.

(7)

The image capture controlling device according to any one of (1) to (6), wherein the controlling unit performs a control to perform the consecutive zoom shooting in an image capturing instruction input period during which an image capturing instruction is input by a user.

(8)

The image capture controlling device according to (7), wherein the controlling unit performs the control regarding a period during which a shutter release button is pressed as the image capturing instruction input period.

(9)

The image capture controlling device according to (8), wherein the controlling unit terminates the consecutive zoom shooting irrespective of whether the shutter release button is pressed or not, when a zoom lens driven in the consecutive zoom shooting reaches an end portion of a driving range of the zoom lens.

(10)

An image capture controlling method including a control procedure in which a subject of a consecutive zoom shooting is analyzed on the basis of an image generated before starting the consecutive zoom shooting, the consecutive shooting being performed by repeating a zooming operation and an image capturing operation, and a control to perform the consecutive zoom shooting is performed using a transition condition of a zoom magnification determined on the basis of a result of the analysis.

(11)

A program for causing a computer to execute a control procedure in which a subject of a consecutive zoom shooting is analyzed on the basis of an image generated before starting the consecutive zoom shooting, the consecutive shooting being performed by repeating a zooming operation and an image capturing operation, and a control to perform the consecutive zoom shooting is performed using a transition condition of a zoom magnification determined on the basis of a result of the analysis.

Still further, the present technology may also be configured as below.

(12)

An image capture controlling device comprising a controlling unit that determines an image capturing condition of a consecutive zoom shooting before starting the consecutive zoom shooting, the consecutive shooting being performed by repeating a zooming operation and an image capturing operation, and that performs the consecutive zoom shooting using the determined image capturing condition in a period during which an image capturing instruction is input by a user.

REFERENCE SIGNS LIST

100, 300 image capturing device
110 lens unit
111 zoom lens
112 aperture
113 focus lens
120 image capturing element
125 shutter
130 operation receiving unit
140 controlling unit
150 signal processing unit
161 record controlling unit
162 recording unit
171 display controlling unit
172 displaying part

180 driving unit
185 lens position detecting unit
190 exposure controlling unit
220 consecutive zoom shooting setting unit
310 subject analyzing unit

The invention claimed is:

1. An image capture controlling device comprising:

circuitry configured to analyze a subject of a consecutive zoom shooting on the basis of an image of the subject generated before starting the consecutive zoom shooting, the consecutive zoom shooting being performed by repeating a zooming operation and an image capturing operation in an optical axis direction, and control to perform the consecutive zoom shooting using a transition condition of a zoom magnification determined on the basis of a result of the analysis, wherein the circuitry is configured to determine the transition condition of the zoom magnification depending on a moving speed of a moving object included in the subject in a direction orthogonal to the optical axis direction.

2. The image capture controlling device according to claim 1, wherein the circuitry is configured to determine the transition condition of the zoom magnification in accordance with a moving speed of a focused subject specified by a user.

3. The image capture controlling device according to claim 1, wherein the circuitry is configured to determine a moving distance of a zoom lens at a time of the zooming operation as the transition condition of the zoom magnification.

4. The image capture controlling device according to claim 1, wherein the circuitry is configured to determine the transition condition of the zoom magnification by changing a processing content of image processing performed while the consecutive zoom shooting is performed.

5. The image capture controlling device comprising circuitry configured to analyze a subject of a consecutive zoom shooting on the basis of an image of the subject generated before starting the consecutive zoom shooting, the consecutive zoom shooting being performed by repeating a zooming operation and an image capturing operation, and control to perform the consecutive zoom shooting using a transition condition of a zoom magnification determined on the basis of a result of the analysis, wherein the circuitry is configured to determine the transition condition of the zoom magnification by changing a processing content of image processing performed while the consecutive zoom shooting is performed, and wherein the circuitry is configured to reduce a load of image processing performed in a course of subjecting a RAW image generated through the consecutive zoom shooting to compression coding to generate an image, as a moving speed of a moving object included in the subject increases to determine the transition condition of the zoom magnification.

6. The image capture controlling device according to claim 1, wherein the circuitry is configured to control to perform the consecutive zoom shooting in an image capturing instruction input period during which an image capturing instruction is input by a user.

7. The image capture controlling device according to claim 6, wherein the circuitry is configured to perform the control regarding a period during which a shutter release button is pressed as the image capturing instruction input period.

8. The image capture controlling device according to claim 7, wherein the circuitry is configured to terminate the consecutive zoom shooting irrespective of whether the shutter release button is pressed or not, in case a zoom lens driven in the consecutive zoom shooting reaches an end portion of a driving range of the zoom lens.

9. An image capture controlling method comprising:

analyzing a subject of a consecutive zoom shooting on the basis of an image of the subject generated before starting the consecutive zoom shooting, the consecutive zoom shooting being performed by repeating a zooming operation and an image capturing operation in an optical axis direction, controlling to perform the consecutive zoom shooting using a transition condition of a zoom magnification determined on the basis of a result of the analysis, and determining the transition condition of the zoom magnification depending on a moving speed of a moving object included in the subject in a direction orthogonal to the optical axis direction.

10. A non-transitory computer readable storage medium, having stored thereon, a set of instructions comprising:

analyzing a subject of a consecutive zoom shooting on the basis of an image of the subject generated before starting the consecutive zoom shooting, the consecutive zoom shooting being performed by repeating a zooming operation and an image capturing operation in an optical axis direction, controlling to perform the consecutive zoom shooting using a transition condition of a zoom magnification determined on the basis of a result of the analysis, and determining the transition condition of the zoom magnification depending on a moving speed of a moving object included in the subject in a direction orthogonal to the optical axis direction.

* * * * *